(12) United States Patent
Mo

(10) Patent No.: US 10,644,558 B2
(45) Date of Patent: May 5, 2020

(54) SYSTEM, METHOD, AND APPARATUS FOR STATOR AND ALTERNATOR FOR ELECTRIC MACHINE

(71) Applicant: Transportation IP Holdings, LLC, Norwalk, CT (US)

(72) Inventor: Rihong Mo, Erie, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 361 days.

(21) Appl. No.: 15/378,117

(22) Filed: Dec. 14, 2016

(65) Prior Publication Data

US 2018/0166938 A1    Jun. 14, 2018

(51) Int. Cl.
| | | |
|---|---|---|
| H02K 3/28 | (2006.01) |
| H02K 3/12 | (2006.01) |
| H02K 3/16 | (2006.01) |
| H02K 3/20 | (2006.01) |

(52) U.S. Cl.
CPC ............... *H02K 3/28* (2013.01); *H02K 3/12* (2013.01); *H02K 3/16* (2013.01); *H02K 3/20* (2013.01)

(58) Field of Classification Search
CPC .. H02K 3/12; H02K 3/16; H02K 3/20; H02K 3/28
USPC ................. 310/179, 180, 184, 198
See application file for complete search history.

(56) References Cited

U.S. PATENT DOCUMENTS

| | | | |
|---|---|---|---|
| 4,896,063 A | | 1/1990 | Roberts |
| 6,469,413 B1 * | | 10/2002 | Oohashi ............... H02K 3/28 310/184 |
| 6,759,780 B2 | | 7/2004 | Liu et al. |
| 7,075,206 B1 | | 7/2006 | Chen |
| 9,130,431 B2 | | 9/2015 | Seguchi et al. |
| 2007/0069667 A1 * | | 3/2007 | Adra ............... H02K 3/28 318/135 |
| 2008/0042508 A1 * | | 2/2008 | Cai ............... H02K 3/28 310/198 |
| 2008/0079401 A1 * | | 4/2008 | Dooley ............... H02K 1/2786 322/90 |
| 2010/0301695 A1 * | | 12/2010 | Yamada ............... H02K 1/2746 310/156.01 |
| 2018/0097431 A1 * | | 4/2018 | Laldin ............... H02K 3/28 |

* cited by examiner

*Primary Examiner* — Nguyen Tran
*Assistant Examiner* — Demetries A Gibson
(74) *Attorney, Agent, or Firm* — McCoy Russell LLP

(57) ABSTRACT

A stator for an electric machine includes a generally cylindrical stator core having a plurality of circumferentially-spaced and axially-extending core teeth that define a plurality of circumferentially-spaced and axially-extending core slots in a surface thereof, a main winding having a plurality of coils, each of the coils including a plurality of turns occupying the plurality of slots in the stator core, and a tertiary excitation winding having a plurality of coils, each of the coils including a single turn occupying at least a subset of the plurality of slots in the stator core. The coils of the main winding are unevenly arranged in the plurality of slots.

18 Claims, 4 Drawing Sheets

| Slot # | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Top | 5A | 5A | 6A | 5B | 5B | 6B | 5C | 5C | 6C | 5A | 5A | 6A | 5B | 5B | 6B | 5C | 5C | 6C |
| Bottom | 5X | 6X | 5Y | 5Y | 6Y | 5Z | 5Z | 6Z | 5X | 5X | 6X | 5Y | 5Y | 6Y | 5Z | 5Z | 6Z | 5X |
| | T | | | F | | | T | | | T | | | F | | | T | | |

FIG. 4

SYSTEM, METHOD, AND APPARATUS FOR STATOR AND ALTERNATOR FOR ELECTRIC MACHINE

BACKGROUND

Technical Field

Embodiments of the invention relate generally to vehicles. Certain embodiments relate to alternators for electric vehicles.

Discussion of Art

In some vehicles, such as off-highway vehicles ("OHVs") utilized in the mining industry, electrically motorized wheels propel or retard the vehicle. In particular, a large horsepower diesel engine may be used with an alternator, a traction inverter, and wheel drive assemblies housed within the rear tires of the vehicle. In operation, the diesel engine drives the alternator, which powers the traction inverter. The traction inverter includes semiconductor power switches that commutate the alternator output current to provide electrical power to electric drive motors, e.g., AC traction motors, of the wheel drive assemblies, which transform the electrical power back into mechanical power to drive the wheels and propel the vehicle.

A typical alternator utilized in electric vehicles, such as mining OHVs, is a 10-pole synchronous generator that converts engine mechanical power to electrical power for use by the drive system of the vehicle. The alternator stator includes a three-phase main winding to provide vehicle propulsion power, and a single-phase tertiary winding to provide self-excitation of the alternator. Typically, the tertiary excitation winding uses only a small portion of all the slots in a stator of the alternator, leaving a vacant space in the remaining slots that is filled with fillers. This is inefficient, however, from an electric machine design perspective. Existing alternators for use in OHV applications have typically been designed to operate between approximately 1000V and 1400V at constant power conditions.

More recent applications require the alternator to generate higher voltage, up to 1800V, in order to improve electric drive system efficiency. In addition, efforts to improve engine efficiency, which is the prime mover for the alternator, have led to engine speed reductions (e.g., from 1900 rpm to 1800 rpm). The combination of this higher voltage requirement and lower engine speed impose additional pressure on the alternator, pushing the alternator to high saturation.

It has been discovered that alternators currently used in OHV applications may not be capable of meeting these new requirements for higher voltage and lower engine speed. Moreover, efforts to simply increase the number of turns within the slots of the stators, while meeting higher voltage requirements at reduced engine speeds, negatively impact operation at high current, which is critical for fuel economy of the vehicle.

In view of the above, there is a need for a system, method and device that differ from those currently available.

BRIEF DESCRIPTION

In an embodiment, a stator for an electric machine is provided. The stator includes a generally cylindrical stator core having a plurality of circumferentially-spaced and axially-extending core teeth that define a plurality of circumferentially-spaced and axially-extending core slots in a surface thereof, a main winding having a plurality of coils, each of the coils including a plurality of turns occupying the plurality of slots in the stator core, and a tertiary excitation winding having a plurality of coils, each of the coils including a single turn occupying at least a subset of the plurality of slots in the stator core. The coils of the main winding are unevenly arranged in the plurality of slots.

In another embodiment, an alternator for an electric machine is provided. The alternator includes a rotor having a plurality of magnets defining a plurality of pole pairs, a stator having a plurality of circumferentially-spaced and axially-extending slots, a main winding having a plurality of coils arranged in the plurality of slots, and a tertiary excitation winding having a plurality of coils arranged in the plurality of slots. The coils of the main winding are not evenly arranged in the plurality of slots.

In yet another embodiment, a method for improving the efficiency of an electric machine is provided. The method includes the steps of arranging a plurality of turns of a main winding in a plurality of slots of a stator of the electric machine such that a number of the turns of the main winding occupying at least one of the plurality of slots is different from a number of the turns of the main winding occupying at least another of the plurality of slots, and arranging a plurality of turns of a tertiary excitation winding in at least a subset of slots of the plurality of slots.

DRAWINGS

The present invention will be better understood from reading the following description of non-limiting embodiments, with reference to the attached drawings, wherein below:

FIG. 4 is a schematic illustration of a winding arrangement or layout for the alternator of FIG. 3.

DETAILED DESCRIPTION

Figure 1:
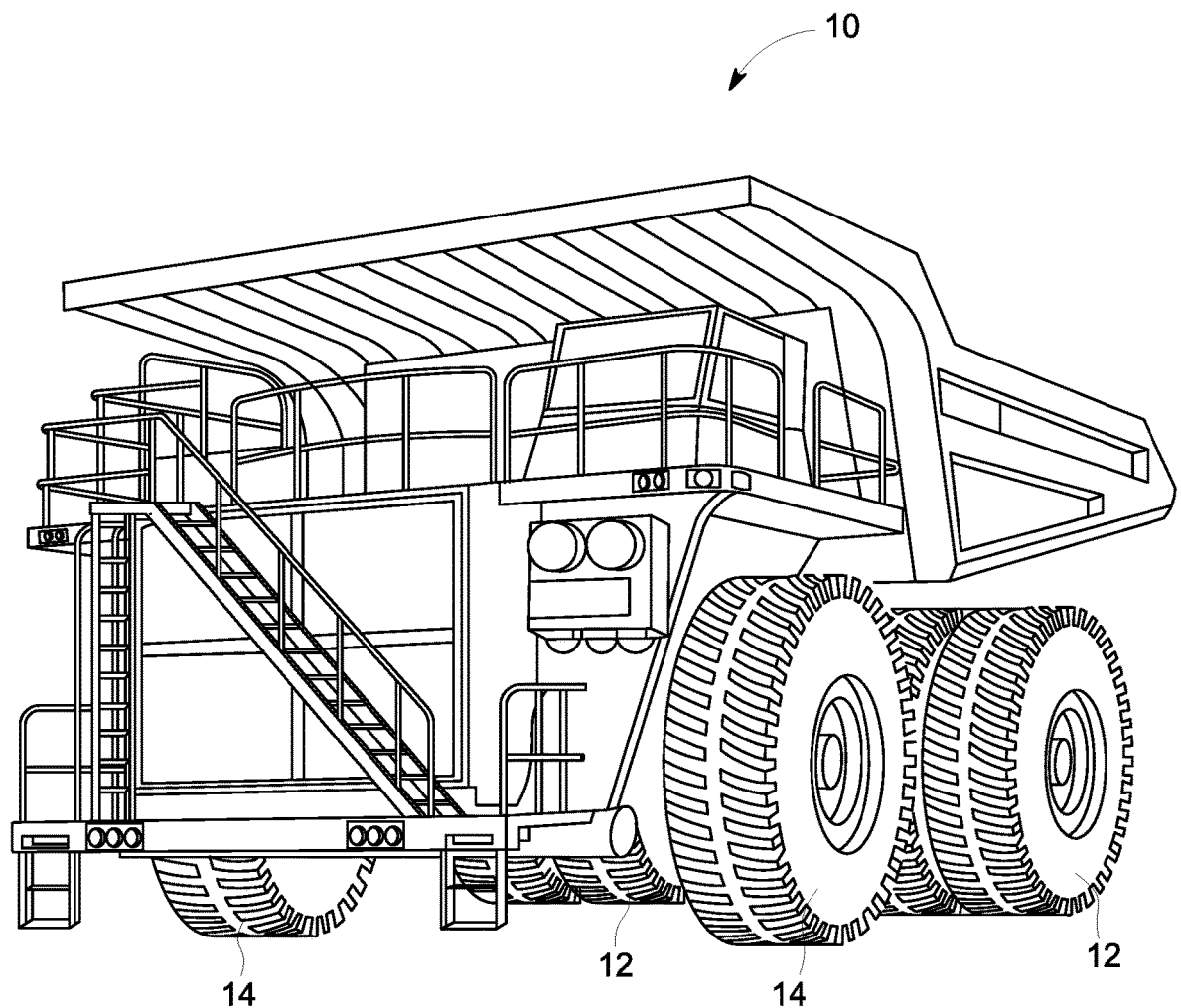
FIG. 1 is a perspective view of an off-highway vehicle (OHV), according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are suitable for use with vehicles, generally, an OHV has been selected for clarity of illustration for the disclosure of mobile embodiments. Other suitable vehicles include, for example, on-road vehicles, locomotives, construction equipment, industrial equipment, and marine vessels. Moreover, while embodiments are described herein in connection with a 90 slot, 10-pole alternator, the invention is more generally applicable to any 18 slot per pole-pair alternator configuration.

As used herein, "electrical communication" or "electrically coupled" means that certain components are configured to communicate with one another through direct or indirect signaling by way of direct or indirect electrical connections. As used herein, "mechanically coupled" refers to any coupling method capable of supporting the necessary forces for transmitting torque between components. As used herein, "operatively coupled" refers to a connection, which may be direct or indirect. The connection is not necessarily being a mechanical attachment. As used herein, "unevenly arranged" and "not evenly arranged" means that the number of turns of a coil of the main winding received in at least one of the slots of the stator is different from the number of turns of a coil of the winding received in at least another of the slots of the stator.

Embodiments of the invention relate generally to electric machines. Certain embodiments relate to system and methods or improving the efficiency of an electric machine and decreasing the fuel consumption of a vehicle with which the electric machine is utilized. In one embodiment, an alternator for an electric drive machine includes a rotor having a plurality of magnets defining a plurality of pole pairs, a stator having a plurality of circumferentially-spaced and axially-extending slots, a main winding having a plurality of coils arranged in the plurality of slots, and a tertiary excitation winding having a plurality of coils arranged in the plurality of slots. The main winding includes coils having a different number of turns which enables a more efficient use of slot space left from the tertiary excitation winding. The electric drive machine with which the alternator may be used may be an off-highway vehicle or other vehicle.

An embodiment of the inventive system for improving the efficiency and/or reducing fuel consumption is configured for use with a vehicle, such as an off-highway vehicle ("OHV") 10 as depicted in FIG. 1. As shown, the OHV 10 is supported on paired dual rear drive tire assemblies 12 and on single front steering tire assemblies 14. The rear drive tire assemblies 12 are driven by a drive system described below in connection with FIG. 2.

Figure 2:
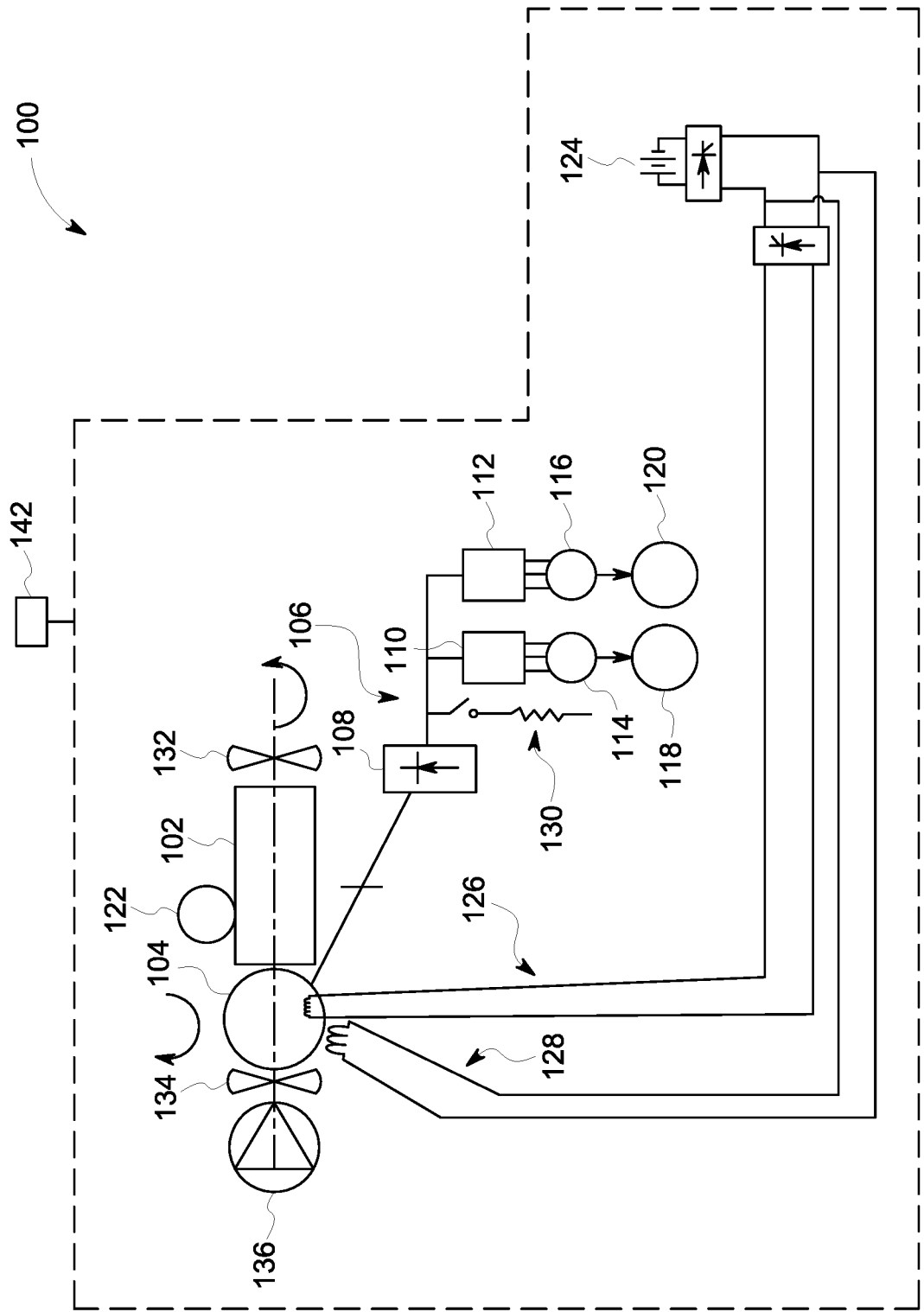
FIG. 2 is a schematic diagram of a drive system of the OHV of FIG. 1.

Turning now to FIG. 2, a schematic illustration of an exemplary drive system 100 for an electric drive machine such as OHV 10 or other vehicle is shown. The drive system 100 includes a primary power source such as an engine 102 (e.g., a diesel engine, a gasoline engine, a multi-fuel engine, etc.) and a traction alternator/generator 104 mechanically coupled to and driven by the engine 102. As illustrated in FIG. 2, the traction alternator 104 is electrically coupled to a traction bus 106. The alternator 104 is configured to provide AC electric power to one or more rectifiers 108, which are electrically connected to one or more power converters, e.g., first and second inverters 110, 112, via the traction bus 106. The inverters 110, 112 are connected to first and second traction motors 114, 116 associated with first and second wheels of the vehicle, e.g., rear wheels 12 (including first rear wheel 118 and second rear wheel 120) of vehicle 10, respectively. The rectifier 108 is configured to convert the AC power received from the alternator 104 into a DC output which is then fed to the inverters 110, 112 through the traction bus 106. The inverters 110, 112 are configured to supply three-phase, variable frequency AC power to the first and second traction motors 114, 116 associated with the first and second wheels of the vehicle (typically the rear wheels of the vehicle). While the rectifier 108 is illustrated as being separate from the traction alternator 104, in certain embodiments, the rectifier may form a part of the alternator, as is known in the art.

As also shown in FIG. 2, in an embodiment, a starter motor 122 may be associated with the engine 102 for rotating the engine 102 so as to initiate operation, as is known in the art. In addition, the vehicle may include a battery 124, e.g. a 24V battery, electrically coupled to the alternator 104 through a tertiary winding 126 and a field winding 128. The battery 124 is configured to function as an alternator field static excitor to initiate operation of the electric drive system of the vehicle. Although FIG. 2 illustrates battery 120 as the excitation source for the alternator 104, other excitation sources and arrangements known in the art may also be utilized without departing from the broader aspects of the invention.

The traction motors 114, 116 provide the tractive power to move the vehicle, and may be AC or DC electric motors. When using DC traction motors, the output of the alternator is typically rectified to provide appropriate DC power. When using AC traction motors, the alternator output is typically rectified to DC and thereafter inverted to three-phase AC before being supplied to the traction motors 114, 116. During a propel mode of operation, power may be transferred from the engine 102 to the traction motors 114, 116, and thus to the wheels of the vehicle to effect movement.

In addition to providing motive power, the traction motors 114, 116 also provide a braking force for controlling the speed of the vehicle on which the drive system 100 is deployed. This is commonly referred to as dynamic braking. During a dynamic braking mode of operation, such as when motion of the vehicle is to be retarded, power may be generated by the mechanical rotation of the drive wheels and directed toward a retarding grid 130. In particular, the kinetic energy of the vehicle may be converted into rotational power at the drive wheels. Rotation of the drive wheels may further rotate the motors 114, 116 so as to generate electrical power, for example, in the form of AC power. The inverters 110, 112 may serve as a bridge to convert the power supplied by the motors 114, 116 into DC power. Dissipation of the DC power generated by the motors 114, 116 may produce a counter-rotational torque at the drive wheels to decelerate the vehicle. Such dissipation may be accomplished by passing the generated current provided by the inverters 110, 112 through a resistance, such as the dynamic braking grid 130, or retarding grid, as shown.

As further illustrated in FIG. 2, the drive system 100 may also include an engine radiator fan 132 driven by the engine 12 to provide cooling for the engine 102. The system 100 may also include one or more auxiliary cooling fans 134 mechanically coupled to the alternator 104. The auxiliary cooling fan(s) 134 is configured to draw air through the opening 18 of the vehicle 10 to provide cooling for other components of the traction drive system, such as the inverters 110, 112, traction motors 114, 116 and the like. The traction alternator 104 may also be coupled to a hydraulic pump 136 which provides hydraulic pressure for use by accessories or other components of the vehicle.

In an embodiment, the drive system 100 and various components thereof may be electrically coupled (or otherwise in communication with) and controlled by a controller 142. In particular, the controller 142 is configured to control the traction motor system 100 and the various components thereof, and the electricity supplied to and from the traction motor system, as is known in the art. For example, the controller 142 is configured to control the drive system 200 to propel the vehicle in response to a propel command received from an operator, as well as brake or slow the vehicle in response to a retard command utilizing the drive system 100 (i.e., using the traction motors 114, 116 operating in a dynamic braking mode of operation).

Figure 3:
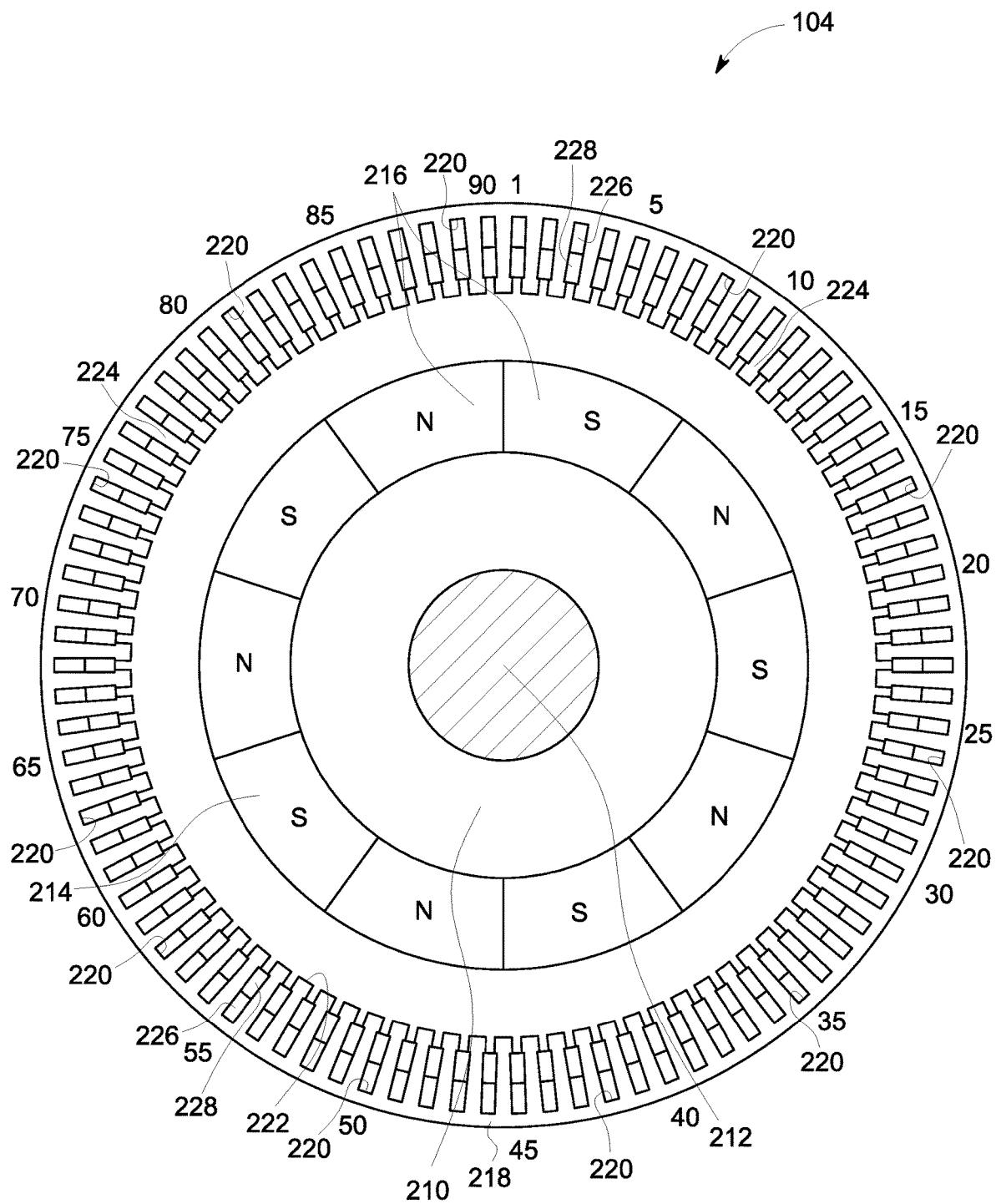
FIG. 3 is a cross-sectional view of an alternator of the drive system of FIG. 2, according to an embodiment of the invention.

With reference to FIG. 3, a cross-sectional illustration of alternator 104 of the drive system 100 is shown in more detail. As shown therein, the alternator 104 is a synchronous generator having a rotor 210 which is mounted on a shaft 212 driven by the engine 102. As illustrated therein, the rotor 210 may be permanent magnet rotor having ten magnetic poles 214 defining a plurality of pole pairs and, more particularly, five pole pairs (including, for example, pole pair 216). In other embodiments, the rotor may be a salient-pole wound field rotor, as shown in FIG. 2.

A generally cylindrically-shaped stator core 218 surrounds the rotor 210, and has a plurality of slots 220 formed in a circumferential inner diameter 222 thereof (and spaced apart by a plurality of teeth 224). The slots 220 extend in an axial direction and parallel to a central axis of the stator core 218 between a first and second end thereof. The slots 220 each have a top portion 226 and a bottom portion 228. In an embodiment, there are ninety slots equally spaced around the circumferential inner diameter 222. Each of the ninety slots 220 are individually numbered in FIG. 3, beginning at slot 1 and proceeding clockwise to slot 90. As used here, the term "generally cylindrical" means generally having the shape of a cylinder.

As discussed in detail hereinafter, the slots 220 of the stator 218 are occupied by a three-phase main winding having a plurality of coils that provide vehicle propulsion power, and a single-phase tertiary winding to provide self-excitation of the alternator 104. Each pole pair such as, for example, pole pair 216, corresponds to a subset of slots of the plurality of slots, within which the coils of the main winding and the tertiary winding are received.

Referring now to FIG. 4, a winding layout 300 for the alternator 104 is illustrated. In the embodiment described herein, where the alternator 104 has ninety slots 220 and ten poles 214 defining five pole pairs, each pole pair (e.g. pole pair 216) takes up eighteen slots 220 of the stator 218 and forms a circuit of the alternator 104. The remaining pole pairs are each associated with a corresponding eighteen-slot subset of slots having a substantially identical winding configuration. That is, the windings connected to each pole pair take up an equal fraction of the total number of slots of the stator 218 and have a substantially identical winding layout or arrangement.

As indicated above, the stator main winding is a three-phase winding having phases A, B and C. In FIG. 4, slots 220, numbered 1-18, defining an exemplary eighteen-slot subset corresponding to one of the pole pairs (e.g., pole pair 216), are shown. Each of the slots 220 is occupied by a plurality of turns of coils of the main winding and/or one or more turns of the tertiary winding. In the winding layout 300 of FIG. 4, 'A' denotes phase A of the main winding, 'B' denotes phase B of the main winding, and 'C' denotes phase C of the main winding, while 'X' denotes phase A return, 'Y' denotes phase B return, and 'Z' denotes phase C return.

As shown in FIG. 4, the main winding comprises a plurality of coils having a different number of turns within the slots. In particular, in an embodiment, the coils of the main winding are arranged in a 5-5-6 pattern in the top portion 226 of the slots, where every third slot 220 (starting with slot 1) has an extra turn (i.e., 6 turns as opposed to 5 turns). For example, slot 1 has 5 turns of phase A of the main winding, slot 2 has 5 turns of phase A of the main winding, and slot 3 has 6 turns of phase A of the main winding. Similarly, slot 4 has 5 turns of phase B, slot 5 has 5 turns of phase B, and slot 6 has 6 turns of phase B. Continuing on, slot 7 has 5 turns of phase C, slot 8 has 5 turns of phase C, and slot 9 has 6 turns of phase C. This arrangement is repeated in slots 10-18.

As further shown in FIG. 4, the return legs of the main winding are likewise arranged to have a different number of turns within the bottom portion 228 of the slots. For example, as shown in FIG. 4, slot 1 has 5 turns of the A phase return (denoted by 'X'), slot 2 has 6 turns of the A phase return (denoted by 'X') and slot 3 has 5 turns of B phase return (denoted by 'Y').

As shown in FIG. 4, therefore, slots 1, 4, 7, 10, 13 and 16 only have ten total turns of the main winding (including the return legs), while the remaining slots have eleven total turns of the main winding (including return legs). This arrangement leaves extra space in the slots having ten total turns, i.e., slots 1, 4, 7, 10, 13 and 16. As shown in FIG. 4, this extra slot space can be occupied by a single turn 312 of the tertiary winding such as, for example, in slots 1, 7, 10 and 16.

As illustrated therein, each of the slots of the eighteen-slot subset therefore has an identical number of turns (main winding plus tertiary winding), with the exception of two slots (i.e., slots 4 and 13). In particular, this winding arrangement maximizes the use of the slot space within the stator 218, and only leaves unoccupied space within slots 4 and 13, which can be filled with a non-metallic filler material 314, as shown in FIG. 4. In an embodiment, substantially all of the slot space in the stator 218 is occupied by turns of the main winding or tertiary winding. In an embodiment, between approximately 80% and 100% of the slot space is occupied by the main winding and tertiary winding, leaving only between about 0% and about 20% of the slot space occupied by filler material. In yet other embodiments, approximately 90% of the slot space and, more particularly, about 89% of the slot space, is occupied by the main winding and tertiary winding, leaving only about 10% and, more particularly, about 11% of the slot space occupied by filler material.

The winding layout 300 for the 90 slot stator 218 therefore includes a main winding comprising 60 five-turn coils and 30 6-turn coils, which optimizes the use of the slot space. In particular, the 5-5-6 main winding arrangement disclosed herein uses an extra conductor in every third slot (as compared to an adjacent and next adjacent slot), which affords the alternator 104 with a balanced performance capability between high voltage and high current, and meets high voltage requirements at reduced engine speeds. In particular, the winding arrangement of the invention fills substantially all of the space in the stator slots with conductive windings (either main windings or tertiary windings), resulting in high operating efficiency. The winding arrangement therefore improves alternator and drive system efficiency as a whole, and thereby results in improved fuel economy.

This is an improvement over existing designs which have typically utilized a stator winding having an identical number of turns of the main winding in each slot. In particular, existing designs typically feature a main winding having 90 identical coils with 5 turns per coil. The coils of the main winding would typically be evenly installed in the 90 slots of the stator core, while the tertiary winding consisting of single turn coils would share and occupy 20 slots with the main winding. This layout leaves 70 slots with extra space not occupied by any turns of coils of either the main winding or tertiary winding. This extra space in the 70 slots is typically filled with non-metallic filler material which does not assist to generate power.

The 5-5-6 winding pattern of the invention, which features an extra turn in every third slot, however, leaves only 10 slots with extra space not occupied by any turns of coils of either the main winding or tertiary winding. As indicated above, this arrangement provides the alternator 104 with a balanced performance capability between high voltage and high current, and meets high voltage requirements at reduced engine speeds. In particular, the alternator winding arrangement of the invention is capable of generating up to approximately 1800V at engine speeds as low as approximately 1800 rpm, yielding an improvement in drive system efficiency over existing alternators typically designed to operate between about 1000V and 1400V at higher speeds of approximately 1900 rpm.

In connection with the above, it has been discovered that the 5-5-6 main winding arrangement disclosed herein reduces stator and rotor current density without changing slot shape. In particular, the improved winding arrangement disclosed herein does not require any punching change or alteration to stator core or rotor design, and can be easily incorporated into existing stators utilizing the space that was typically occupied by the non-metallic filler material.

As indicated above, while embodiments have been described herein in connection with a 90 slot, 10-pole alternator, the invention is more generally applicable to any 18 slot per pole-pair alternator configuration. For example, the winding configuration of the invention is equally applicable to an alternator having 72 slots and eight poles (defining four pole pairs), or 54 slots and 6 poles (defining three pole pairs).

In an embodiment, a stator for an electric machine is provided. The stator includes a generally cylindrically-shaped stator core having a plurality of circumferentially-spaced and axially-extending core teeth that define a plurality of circumferentially-spaced and axially-extending core slots in a surface thereof, a main winding having a plurality of coils, each of the coils including a plurality of turns occupying the plurality of slots in the stator core, and a tertiary excitation winding having a plurality of coils, each of the coils including a single turn occupying at least a subset of the plurality of slots in the stator core. The coils of the main winding are unevenly arranged in the plurality of slots. In an embodiment, a number of turns of the main winding occupying at least one of the plurality of slots is different from a number of turns of the main winding occupying at least another of the plurality of slots. In an embodiment, the plurality of slots is 90 slots. In an embodiment, every third slot of the plurality of slots has an additional turn as compared to an adjacent and a next adjacent slot of the plurality of slots. In an embodiment, the coils of the main winding occupy the plurality of slots of the stator core in a 5-5-6 pattern. In an embodiment, the subset of slots of the plurality of slots occupied by the turns of the tertiary excitation winding is 20 slots, and a filler material occupies 10 slots only of the plurality of slots. In an embodiment, the main winding includes 60 5-turn coils and 30 6-turn coils. In an embodiment, the electric machine is an alternator having one of a permanent magnet rotor or salient-pole rotor, and includes ten magnetic poles defining a plurality of pole pairs.

In another embodiment, an alternator for an electric machine is provided. The alternator includes a rotor having a plurality of magnets defining a plurality of pole pairs, a stator having a plurality of circumferentially-spaced and axially-extending slots, a main winding having a plurality of coils arranged in the plurality of slots, and a tertiary excitation winding having a plurality of coils arranged in the plurality of slots. The coils of the main winding are not evenly arranged in the plurality of slots. In an embodiment, the plurality of coils of the main winding each include a plurality of turns, and the plurality of coils of the tertiary excitation winding each include a single turn. In an embodiment, a number of the turns of the main winding occupy at least one of the plurality of slots is different from a number of the turns of the main winding occupy at least another of the plurality of slots. In an embodiment, the plurality of coils of the main winding occupy the plurality of slots of the stator in a 5-5-6 pattern. In an embodiment, the plurality of slots is 90 slots and the plurality of magnets is 10 magnets defining 5 pole pairs. In an embodiment, the main winding includes 60 5-turn coils and 30 6-turn coils. In an embodiment, the coils of the main winding and the coils of the tertiary winding occupy approximately 90% of a slot space defined by the plurality of slots. In an embodiment, a non-metallic filler material occupies a portion of not more than about 11% of the plurality of slots. In an embodiment, the electric machine is an off-highway vehicle. And the alternator is coupled to an engine of the off-highway vehicle.

In yet another embodiment, a method for improving the efficiency of an electric machine is provided. The method includes the steps of arranging a plurality of turns of a main winding in a plurality of slots of a stator of the electric machine such that a number of the turns of the main winding occupying at least one of the plurality of slots is different from a number of the turns of the main winding occupying at least another of the plurality of slots, and arranging a plurality of turns of a tertiary excitation winding in at least a subset of slots of the plurality of slots. In an embodiment, the number of turns of the main winding occupying the at least one of the plurality of slots is greater than the number of turns of the main winding occupying the at least another of the plurality of slots. The subset of slots in which the turns of the tertiary winding are arranged includes the at least another of the plurality of slots. In an embodiment, the plurality of turns of the main winding are arranged in a 5-5-6 configuration in the plurality of slots. As should be appreciated, in any of these embodiments, the efficiency of the electric machine is improved relative to providing the same stator but where the number of turns of the main winding is the same in every slot.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:
1. A stator for an electric machine, comprising:
a generally cylindrical stator core having a plurality of circumferentially-spaced and axially-extending core teeth that define a plurality of circumferentially-spaced and axially-extending core slots in a surface thereof;

a main winding having a plurality of coils, each of the coils including a plurality of turns occupying the plurality of circumferentially-spaced and axially-extending core slots in the stator core; and a tertiary excitation winding having a plurality of coils, each of the coils including a single turn occupying at least a subset of the plurality of circumferentially-spaced and axially-extending core slots in the stator core;

wherein the plurality of coils of the main winding is unevenly arranged in the plurality of circumferentially-spaced and axially-extending core slots; and wherein at least 80% of the plurality of circumferentially-spaced and axially-extending core slots have an identical number of turns, wherein the turns are of the main winding and/or of the main winding and the tertiary excitation winding.

2. The stator of claim 1, wherein:

a number of turns of the main winding occupying at least one of the plurality of circumferentially-spaced and axially-extending core slots is different from a number of turns of the main winding occupying at least another of the plurality of circumferentially-spaced and axially-extending core slots.

3. The stator of claim 2, wherein:

every third slot of the plurality of circumferentially-spaced and axially-extending core slots has an additional turn of the main winding as compared to an adjacent and a next adjacent slot of the plurality of circumferentially-spaced and axially-extending core slots.

4. The stator of claim 3, wherein:

the plurality of coils of the main winding occupies the plurality of circumferentially-spaced and axially-extending core slots of the stator core in a 5-5-6 turn pattern.

5. The stator of claim 4, wherein:

the plurality of circumferentially-spaced and axially-extending core slots is 90 slots.

6. The stator of claim 5, wherein:

the subset of the plurality of circumferentially-spaced and axially-extending core slots occupied by the single turn of the tertiary excitation winding is 20 slots; and a filler material occupies 10 slots only of the plurality of circumferentially-spaced and axially-extending core slots.

7. The stator of claim 5, wherein:

the main winding includes 60 5-turn coils and 30 6-turn coils.

8. The stator of claim 1, wherein:

the electric machine is an alternator having one of a permanent magnet rotor or a salient-pole rotor, and includes 10 magnetic poles defining a plurality of pole pairs.

9. The stator of claim 1, wherein every third slot of the plurality of circumferentially-spaced and axially-extending core slots has an additional turn of the main winding relative to an adjacent and a next adjacent slot of the plurality of circumferentially-spaced and axially-extending core slots.

10. An alternator for an electric machine, comprising:

a rotor having a plurality of magnets defining a plurality of pole pairs;

a stator having a plurality of circumferentially-spaced and axially-extending slots;

a main winding having a plurality of coils arranged in the plurality of circumferentially-spaced and axially-extending core slots; and a tertiary excitation winding having a plurality of coils arranged in the plurality of circumferentially-spaced and axially-extending core slots;

wherein the plurality of coils of the main winding is not evenly arranged in the plurality of circumferentially-spaced and axially-extending core slots; and wherein at least 80% of the plurality of circumferentially-spaced and axially-extending core slots have an identical number of turns, wherein the turns are of the main winding and/or of the main winding and the tertiary excitation winding.

11. The alternator of claim 10, wherein:

the plurality of coils of the main winding each include a plurality of turns; and the plurality of coils of the tertiary excitation winding each include a single turn.

12. The alternator of claim 11, wherein:

a number of the plurality of turns of the main winding occupying at least one of the plurality of circumferentially-spaced and axially-extending core slots is different from a number of the plurality of turns of the main winding occupying at least another of the plurality of circumferentially-spaced and axially-extending core slots.

13. The alternator of claim 12, wherein:

the plurality of coils of the main winding occupies the plurality of circumferentially-spaced and axially-extending core slots of the stator in a 5-5-6 turn pattern.

14. The alternator of claim 13, wherein:

the plurality of circumferentially-spaced and axially-extending core slots is 90 slots; and the plurality of magnets is 10 magnets defining five pole pairs.

15. The alternator of claim 14, wherein:

the main winding includes 60 5-turn coils and 30 6-turn coils.

16. The alternator of claim 10, wherein:

the plurality of coils of the main winding and the plurality of coils of the tertiary excitation winding occupy approximately 90% of a slot space defined by the plurality of circumferentially-spaced and axially-extending core slots.

17. The alternator of claim 10, wherein:

a non-metallic filler material occupies a portion of not more than about 11% of the plurality of circumferentially-spaced and axially-extending core slots.

18. The alternator of claim 10, wherein:

the electric machine is an off-highway vehicle, and the alternator is coupled to an engine of the off-highway vehicle.

* * * * *